United States Patent
Fisher et al.

(10) Patent No.: US 10,135,247 B2
(45) Date of Patent: Nov. 20, 2018

(54) METHODS AND SYSTEMS FOR INTEGRATED VOLT/VAR CONTROL IN ELECTRIC NETWORK

(71) Applicant: General Electric Company, Schenectady, NY (US)

(72) Inventors: Rayette Ann Fisher, Niskayuna, NY (US); Wei Ren, Niskayuna, NY (US); Murali Mohan Baggu Datta Venkata Satya, Glenville, NY (US); Felipe Antonio Chegury Viana, Niskayuna, NY (US); Krishna Kumar Anaparthi, Munich (DE); Reigh Allen Walling, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 954 days.

(21) Appl. No.: 14/056,400

(22) Filed: Oct. 17, 2013

(65) Prior Publication Data
US 2015/0112496 A1 Apr. 23, 2015

(51) Int. Cl.
*H02J 4/00* (2006.01)
*H02J 3/16* (2006.01)
(Continued)

(52) U.S. Cl.
CPC ............... *H02J 3/16* (2013.01); *H02J 3/383* (2013.01); *H02J 13/0006* (2013.01);
(Continued)

(58) Field of Classification Search
CPC .. H02J 3/16; H02J 3/383; H02J 3/1842; H02J 13/0006; H02J 13/0062; H02J 13/0075;
(Continued)

(56) References Cited

U.S. PATENT DOCUMENTS

| 5,422,561 A | * | 6/1995 | Williams | H02J 3/1821 |
| | | | | 307/31 |
| 7,091,703 B2 | * | 8/2006 | Folts | H02J 3/1828 |
| | | | | 323/207 |

(Continued)

FOREIGN PATENT DOCUMENTS

| CN | 102025150 A | 4/2011 |
| CN | 102210079 A | 10/2011 |

(Continued)

OTHER PUBLICATIONS

European Search Report and Opinion issued in connection with corresponding EP Application No. 14189263.8 dated Apr. 20, 2015.

(Continued)

*Primary Examiner* — M. N. Von Buhr
(74) *Attorney, Agent, or Firm* — GE Global Patent Operation; Nitin Joshi

(57) ABSTRACT

A method and system for use in controlling an electric network are provided. The system includes an Integrated Volt-VAr Control (IVVC) component configured to determine optimization parameters for slow dynamics electromechanical devices and fast dynamics DER devices coupled to the network. The slow dynamics devices are controlled by a present state of the electric network and a voltage rise table that is adaptively updated in real-time using a command output, or a power flow-based complete optimization routine that generates optimal setpoints for the traditional controllable assets and for at least some of the fast dynamics DER devices. The fast dynamics devices are controlled locally using a control algorithm that uses a reactive power contribution based on IVVC settings, based on photo-voltaic (PV) plant active power variations, based on power factor, or based on a voltage of the local electric network.

14 Claims, 10 Drawing Sheets

(51) Int. Cl.
*H02J 3/38* (2006.01)
*H02J 13/00* (2006.01)
*H02J 3/00* (2006.01)
*H02J 3/18* (2006.01)

(52) U.S. Cl.
CPC ......... *H02J 3/1842* (2013.01); *H02J 13/0062* (2013.01); *H02J 13/0075* (2013.01); *H02J 13/0079* (2013.01); *H02J 2003/007* (2013.01); *Y02B 70/3216* (2013.01); *Y02E 10/563* (2013.01); *Y02E 40/22* (2013.01); *Y02E 40/34* (2013.01); *Y02E 40/72* (2013.01); *Y02E 60/726* (2013.01); *Y02E 60/76* (2013.01); *Y02E 60/7838* (2013.01); *Y02E 60/7853* (2013.01); *Y04S 10/123* (2013.01); *Y04S 10/24* (2013.01); *Y04S 20/221* (2013.01); *Y04S 40/124* (2013.01); *Y04S 40/126* (2013.01); *Y04S 40/22* (2013.01)

(58) Field of Classification Search
CPC . H02J 13/0079; H02J 2003/007; Y04S 10/24; Y04S 10/123; Y04S 20/221; Y04S 40/22; Y04S 40/124; Y04S 40/126; Y02B 70/3216; Y02E 10/563; Y02E 40/22; Y02E 40/34; Y02E 40/72; Y02E 60/76; Y02E 60/726; Y02E 60/7838; Y02E 60/7853
See application file for complete search history.

(56) References Cited

U.S. PATENT DOCUMENTS

| | | | |
|---|---|---|---|
| 7,508,173 B2 | 3/2009 | Zhou et al. | |
| 7,663,348 B2 | 2/2010 | Oohara et al. | |
| 7,687,937 B2 | 3/2010 | Lasseter et al. | |
| 7,768,155 B2 | 8/2010 | Fornage | |
| 7,796,412 B2 | 9/2010 | Fornage | |
| 7,817,450 B2 | 10/2010 | Fornage | |
| 7,855,473 B2 | 12/2010 | Fornage | |
| 7,899,632 B2 | 3/2011 | Fornage et al. | |
| 7,916,505 B2 | 3/2011 | Fornage | |
| 7,923,983 B2 | 4/2011 | Fornage | |
| 7,925,459 B2 | 4/2011 | Fornage | |
| 7,944,083 B2 | 5/2011 | Fornage et al. | |
| 7,986,122 B2 | 7/2011 | Fornage et al. | |
| 7,986,539 B2 | 7/2011 | Fornage | |
| 8,035,257 B2 | 10/2011 | Fornage | |
| 8,076,802 B2 | 12/2011 | Fornage | |
| 8,099,197 B2 | 1/2012 | Smith et al. | |
| 8,107,516 B2 | 1/2012 | Fornage | |
| 8,179,147 B2 | 5/2012 | Dargatz et al. | |
| 8,183,852 B2 | 5/2012 | Fornage | |
| 8,195,338 B2* | 6/2012 | Feng | H02J 3/00 700/286 |
| 8,195,414 B2 | 6/2012 | Fornage et al. | |
| 8,222,767 B2 | 7/2012 | Fornage | |
| 8,283,903 B2* | 10/2012 | Feng | H02J 3/1828 323/209 |
| 8,437,883 B2* | 5/2013 | Powell | G01D 4/002 290/44 |
| 8,588,993 B2* | 11/2013 | Feng | H02J 3/00 307/31 |
| 8,595,094 B1* | 11/2013 | Forbes, Jr. | G05D 17/00 705/34 |
| 8,680,720 B2* | 3/2014 | Schauder | H02M 1/42 307/140 |
| 8,761,954 B2* | 6/2014 | Milosevic | H02J 3/14 700/286 |
| 8,963,558 B2 | 2/2015 | Pan et al. | |
| 9,099,890 B2* | 8/2015 | Vukojevic | H02J 3/1828 |
| 9,274,513 B2* | 3/2016 | Bell | H02J 3/1878 |
| 9,325,174 B2* | 4/2016 | Tyler | H02J 3/32 |
| 9,354,641 B2* | 5/2016 | Peskin | G05B 13/04 |
| 9,367,075 B1* | 6/2016 | Powell | H02J 3/1821 |
| 2010/0067271 A1 | 3/2010 | Garces et al. | |
| 2010/0314940 A1 | 12/2010 | Palmer et al. | |
| 2011/0196546 A1* | 8/2011 | Muller | H02J 3/383 700/295 |
| 2011/0231028 A1* | 9/2011 | Ozog | G06Q 10/06 700/291 |
| 2011/0285362 A1 | 11/2011 | Huomo | |
| 2012/0022713 A1* | 1/2012 | Deaver, Sr. | G05B 17/02 700/298 |
| 2012/0049636 A1 | 3/2012 | Galbraith et al. | |
| 2012/0153725 A1 | 6/2012 | Grohman | |
| 2012/0191439 A1* | 7/2012 | Meagher | G06F 17/5009 703/18 |
| 2012/0191440 A1* | 7/2012 | Meagher | H02J 3/38 703/18 |
| 2012/0197450 A1* | 8/2012 | Krok | H02J 3/16 700/291 |
| 2012/0217807 A1* | 8/2012 | Galler | H02J 3/381 307/53 |
| 2013/0030591 A1 | 1/2013 | Powell et al. | |
| 2013/0253718 A1* | 9/2013 | Meagher | G05B 13/02 700/291 |
| 2013/0253898 A1* | 9/2013 | Meagher | G06F 17/5009 703/18 |
| 2013/0268131 A1* | 10/2013 | Venayagamoorthy | H02J 3/16 700/286 |
| 2014/0084687 A1* | 3/2014 | Dent | H02M 1/32 307/26 |
| 2016/0118795 A1* | 4/2016 | Berkowitz | H02J 3/1807 700/286 |
| 2017/0358949 A1* | 12/2017 | Forbes, Jr. | G05B 13/0255 |

FOREIGN PATENT DOCUMENTS

| | | |
|---|---|---|
| EP | 2296246 A2 | 3/2011 |
| GB | 2471759 A | 1/2011 |
| WO | 2011032265 A1 | 3/2011 |

OTHER PUBLICATIONS

"Monitoring and Measurement Report III", Smart Grid, Smart City Project, pp. 1-23 (Jan. 1-Jun. 30, 2012).

Olamaie, J., et al., "Daily Volt/Var Control in Distribution Networks With Regard to Dgs: A Comparison of Evolutionary Methods," IEEE Power India Conference, pp. 1-6 (2006).

"WECC Wind Power Plant Dynamic Modeling Guide," Western Electricity Coordinating Council Modeling and Validation Work Group, pp. 1-52 (Aug. 2010).

First Office Action and Search issued in connection with corresponding CN Application No. 201410553157.7 dated Nov. 3, 2017.

Turitsyn et al., "Distributed Control of Reactive Power Flow in a Radial Distribution Circuit With High Photovoltaic Penetration", Power and Energy Society General Meeting 2010, IEEE, pp. 1-6, Jul. 25-29, 2010.

Rizy et al., "Volt/Var Control Using Inverter-Based Distributed Energy Resources", Power and Energy Society General Meeting, 2010, IEEE, pp. 1-8, Jul. 24-29, 2011.

* cited by examiner

200
METHODS AND SYSTEMS FOR INTEGRATED VOLT/VAR CONTROL IN ELECTRIC NETWORK

BACKGROUND OF THE DISCLOSURE

The embodiments described herein relate generally to electric power generation and delivery systems and, more particularly, to systems and methods for using distributed energy resources (DER) in an electric network that includes variable generating systems.

Power generated by an electric generating entity is typically delivered to a customer via an electric network or grid that consists of transmission and distribution circuits. The electric power generation and transmission system is closely monitored and controlled by an electric grid control system that includes a large number of individual subsystems, which may also include multiple components. Typically, information is transmitted from many of the subsystems/components to the control system for use in controlling operation of the electric grid. For example, some electric generation entities utilize an Energy Management System or Control Center.

Known Energy Management Systems include a plurality of components and subsystems that communicate with, and may be controlled by, a central management system, typically located at the electric generating entity. The components and subsystems may be distributed at various points in the electric network to facilitate power transmission. Due at least in part to the large scale of an Energy Management System, and the quantity of individual component/subsystems that may be included, information at the management system, for use in centralized management of the generation and transmission, is generally expansive and complex.

Traditionally, for distribution systems, voltage and reactive power (Volt-VAr) control have been performed to overcome both over-voltage and under-voltage violations through controllable reactive power sources present in the system. By controlling the production, absorption, and flow of reactive power present in the system, Volt-VAr control can maintain the voltage profile within acceptable limits and reduce the distribution system losses. Traditional Volt-VAr control is achieved by reconfiguring controllable devices such as voltage regulators and Load Tap Changers of transformers (LTC) for voltage control, and shunt reactors and shunt capacitors for VAr control.

However, feeder voltage and reactive power flow are closely related and dependent variables for which control actions to change one of the variables can result in opposing control actions to change the other variable. For example, raising the voltage using the substation transformer LTC can produce a voltage rise that could cause capacitor bank controls to remove a capacitor bank from service, thus lowering the voltage. Similarly, placing a capacitor bank in service could cause the LTC to lower the voltage at the substation.

While such conflicting control actions generally do not produce unacceptable electrical conditions on the feeder, they do produce conditions that are less efficient. The coordinated control of voltage and reactive power is needed to determine and execute volt-VAR control actions that are truly optimal.

Furthermore, known distribution management systems (DMS) based VVC solutions are not very scalable and have high implementation and operation costs that hinder electric generating entity adoption. Conventional local volt-var control techniques are not capable of voltage flattening, CVR, reactive power reduction and unity power factor that increases the efficiency of the system.

Generally, a majority of customers (i.e., loads) are located at the distribution circuits. Power utilities desire to monitor and control the components that are distributed along the distribution circuits. For this purpose, some power utilities utilize what is referred to as a "smart grid." At least some known smart grids include a plurality of components and subsystems that communicate with, and may be controlled by, a central management system, typically located at the electric generating entity. The components and subsystems may be distributed at various points in the electric generating entity distribution network to facilitate power distribution to customers. Due at least in part to the large scale of a smart grid, and the quantity of individual component/subsystems that may be included in the smart grid, information at the management system, for use in centralized management of the smart grid, is generally expansive and complex.

Electric power losses across distribution feeders in an electric network, is a concern for distribution systems engineers. Between about three percent and about eight percent of power transmitted on distribution feeders is lost. The electric power losses include ohmic losses, losses from reactive power flow, and losses due to harmonic currents resulting from nonlinear loads of the system. Presently, various voltage/Var control schemes are sometimes used to reduce transmission losses. In at least one known scheme, Var compensation is implemented by the use of the capacitor banks that are placed on critical buses of an electric network system to supply reactive power to support and attempt to optimize the voltage profile of the system. Real time control actions can be implemented, to some extent, through switched capacitor banks. However, such capacitor banks, including switched capacitor banks, are placed only at discrete points of the electric network and inject discrete levels of reactive power. Moreover, the control of switched capacitor banks is commonly based on information local to the particular switched capacitor bank.

With the addition of fast dynamics distributed energy resources (DER) additional control is needed to account for estimated control inputs from the DERs. For example, many slow dynamics electromechanical devices are capable of controlling voltage on the grid over relatively long periods of time. Such legacy type devices are able to account for daily load variations that are generally well characterized, such as load variations due to heavy electrical load increases as factories come on line in the morning and load decreases due to factories and other large loads securing in the evening. However, the power, reactive power, and voltage support capabilities of DERs can vary over very short intervals of time. A photovoltaic installation may be affected by clouds passing over the collecting field or a wind farm may be affected by variable winds.

BRIEF DESCRIPTION OF THE DISCLOSURE

In one embodiment, a system for use in controlling an electric network includes a plurality of slow dynamics electromechanical devices and a plurality of fast dynamics DER devices coupled to the electric network. The system includes an Integrated Volt-VAr Control (IVVC) component configured to determine one or more optimization parameters for the plurality of slow dynamics electromechanical devices and the plurality of fast dynamics DER devices. The slow dynamics devices are controlled by a present state of the electric network and at least one of a voltage rise table that is adaptively updated in real-time using a command output and a power flow-based complete optimization routine for generating optimal setpoints for the traditional controllable assets and for at least some of the fast dynamics DER devices. The fast dynamics devices are controlled locally between the remote control update using at least one of 1). a control algorithm using a Distributed Energy Resource (DER) reactive power contribution based on IVVC settings, 2). a control algorithm using a DER reactive power contribution based on the variable generation plant active power variations, 3). a control algorithm using a DER reactive power contribution based on power factor, and 4). a control algorithm using a DER reactive power contribution based on a voltage of the local electric network.

In another embodiment, a method of controlling an electric network includes a). modeling the electric network to determine an expected voltage response to a first electric network state, the state relating to a first configuration of components of the electric network, b). determining a second state of the electric network, the second state occurring a predetermined time after the first state, c). receiving historical state data of the electric network, the historical state occurring prior to the occurrence of the first state, d). determining a second configuration of the components of the electric network based on the model, second network state, and historical network state data, e). transmitting commands to the components to achieve the second configuration, and f). re-perform steps a)-e) after a predetermined time period.

In yet another embodiment, an electric network control system includes a network model component comprising a model of electrical components electrically coupled to form an electrical transmission and distribution network, a measurement component configured to receive, from a plurality of sensors, data relating to measured parameters of the network and configured to determine a present state of the electric network, a historian component configured to receive the sensor data and store at least some of the sensor data, an estimator component configured to determine an estimate of a system load on the electric network and an estimate of generation of renewable sources coupled to the electric network using the at least some of the sensor data, an integrated Volt-VAr control (IVVC) component configured to determine one or more optimization parameters for slow dynamics devices and fast dynamics devices coupled to the electric network, wherein the slow dynamics devices are configured to be operable at a single value of the one or more optimization parameters for a relatively long time period compared to a relatively short time period that the fast dynamics devices are operable at a single value of the one or more optimization parameters, and a dispatch command component configured to receive the optimization parameters, determine at least one of an optimal commitment for capacitor bank devices, distributed energy resource (DER) reactive power baseline values, and tap settings for voltage regulator and load tap changers (LTC), and issue a dispatch message to the devices connected to the electric network.

BRIEF DESCRIPTION OF THE DRAWINGS

FIGS. 1-10 show example embodiments of the method and system described herein.

FIG. 1 is a block diagram of an exemplary electric power generation and delivery system.

FIG. 2 is an example block diagram of the management system shown in FIG. 1.

FIG. 3 is a flow diagram of a process of local DER control incorporated into the IVVC optimization control.

FIG. 4 is a schematic one-line diagram of a bus system that simply illustrates the more complicated system shown in FIG. 1.

FIG. 5 is a graph of a PV profile used as a daily forecast of PV generation that includes faster variations of PV over a five hour period from, for example, Hour 11 to Hour 16.

FIG. 10 is a graph of a comparison average voltage within the distribution network for each of the four methods for local DER control.

Figure 1:
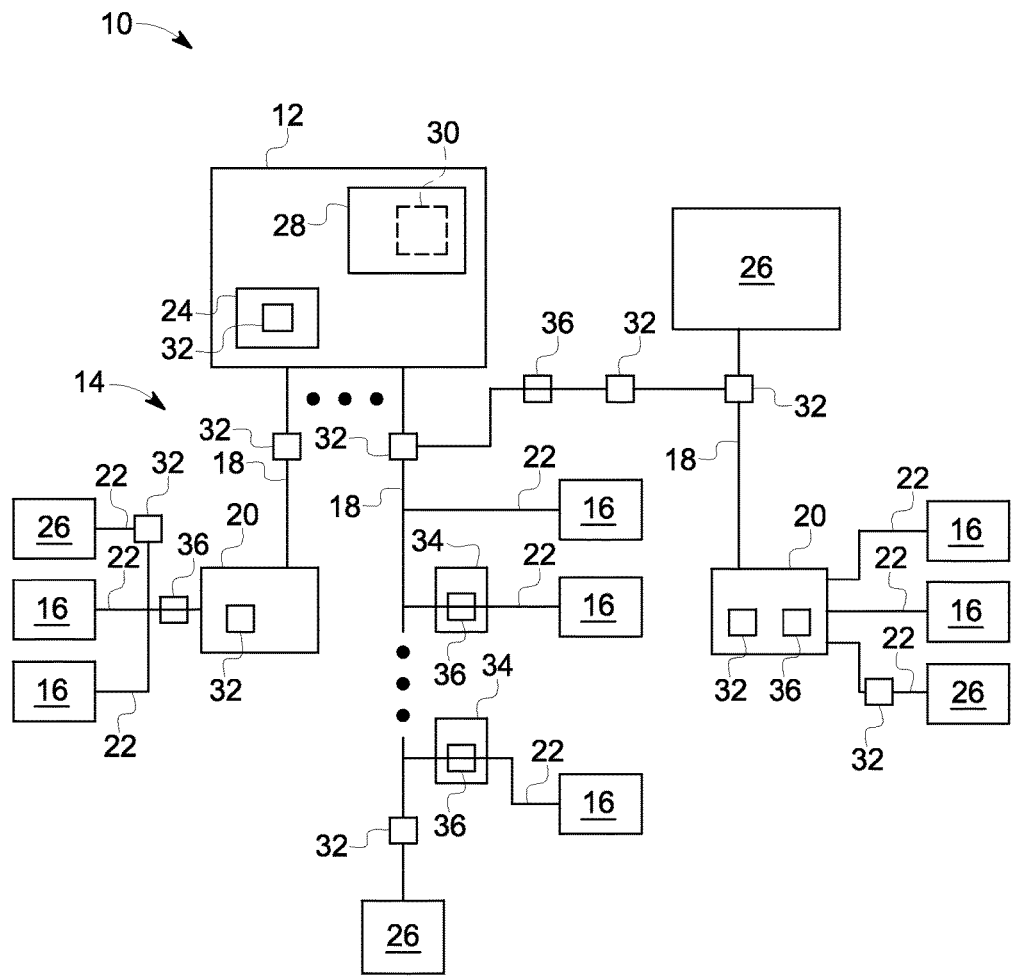

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION OF THE DISCLOSURE

The following detailed description illustrates embodiments of managing an electric distribution network that includes a plurality of generation sources, electric loads, and fast and slow dynamics reactive components spaced over a wide geographic area.

The following disclosure describes adaptive logic that provides autonomous real-time update of voltage rise tables in coordinated volt-var control (CVVC). The method improves current CVVC methodology using relatively slow-acting legacy electromechanical devices with the inclusion of dynamic, fast-acting distributed energy resources (DER). The adaptive logic enables coordinated volt-var control to handle daily load variation, optimal feeder reconfiguration, and dynamic changes in the grid caused by topology change (due to fault, FDIR operation) and distributed generation.

Adaptive CVVC as described herein includes a closed loop that starts with an off-line voltage rise look-up table that is based on current system data (e.g. capacitor bank grid location and value) and off-line simulation of today's grid configuration and loading. Following control actions that change the grid configuration or load, SCADA measurements are fed-back to provide updated system information to the adaptive logic. In addition, the adaptive logic function receives the most updated volt-var control actions. Given these two inputs, it in turn updates in real-time the voltage rise table for the feeder. The inclusion of new capacitor banks or other VAR controllable assets at a later date with grid growth can be handled by sparsely filling the voltage rise table matrix and interpolating to find the voltage values for the gaps where future controllable var assets will be located. Similarly, the addition of controllable reactive generation from inverters can be represented within the voltage rise table by enabling the new reactive assets to fill in the spaces of the sparsely populated matrix where previously values had been interpolated.

The following description refers to the accompanying drawings, in which, in the absence of a contrary representation, the same numbers in different drawings represent similar elements.

The following detailed description illustrates example embodiments of the disclosure by way of example and not by way of limitation. It is contemplated that the disclosure has general application to analytical and methodical embodiments of managing operation and maintenance of widely geographically diverse power assets in industrial, commercial, and residential applications.

FIG. 1 is a block diagram of an exemplary electric power generation and delivery system 10. In the exemplary embodiment, electric power generation and delivery system 10 includes an electric generating entity 12, electric grid 14, and a plurality of customer or energy user locations 16. Moreover, electricity is delivered from electric generating entity 12 to customer or energy user locations 16 via electric grid 14. More specifically, electric grid 14 includes a plurality of transmission lines 18, a plurality of electric substations 20, and a plurality of distribution lines 22 that enable distribution of electricity. Although transmission lines 18 and distribution lines 22 are illustrated as single lines, each transmission line 18 and distribution line 22 may include one or more lines, each carrying a single phase, two phases, or three phases of power.

Moreover, in the example embodiment, electric generating entity 12 includes an electric power generation system 24 that supplies electrical power to electric grid 14. Electric power generation system 24 may include a generator driven by, for example, a gas turbine engine, a hydroelectric turbine, a wind turbine, one or more solar panels, and/or another suitable generation system. In the example embodiment, system 10 includes multiple distributed energy resources 26. Distributed energy resources 26 may include a generator driven by, for example, a gas turbine engine, a hydroelectric turbine, a wind turbine, one or more solar panels, one or more batteries or banks of batteries, and/or another suitable power generation system. Distributed energy resources 26 may belong to (e.g. be owned by or be part of) electric generating entity 12, may belong to a different electric generating entity, or may belong to a customer of the electric generating entity. Although four distributed energy resources 26 are shown in the example embodiment, electric power generation and delivery system 10 may include any number of distributed energy resources 26 distributed throughout grid 14.

Electric generating entity 12 also includes a distribution control center substation 28 that facilitates control of energy production and/or delivery. Distribution control center substation 28 is illustrated as being included within electric generating entity 12, however, distribution control center substation 28 may be external to electric generating entity 12 (e.g., remotely located, etc.) and in communication with electric generating entity 12, or it may be located in one of the electric generating entity substations 20. Moreover, distribution control center substation 28 may be in communication with distributed energy resources 26, whether located internal or external to distributed energy resources 26.

Distribution control center substation 28 includes a management system 30 that provides operator control for managing power delivered from electric power generation system 24 and/or distributed into electric grid 14. Management system 30 may control distribution to electrical substations 20, to customer or energy user locations 16, and/or other suitable points within electric grid 14. Management system 30 may be usable to detect operating conditions in the electric grid 14, alter a configuration of grid 14, and/or other operations associated with electric grid 14 and/or electric power generation system 24. Specifically, in the example embodiment, management system 30 is coupled to a plurality of switchable assets 32 distributed throughout system 10.

In one example, management system 30 may be employed to rapidly respond to outage/fault conditions to reconfigure to electric grid 14, via one or more switchable assets 32 (sometimes referred to herein as switches 32), in an effort to limit potential safety issues, to control power distribution, and/or to limit damage to/from electric grid 14. In another example, to enable the installation of equipment or the replacement of existing equipment, a switch plan may be provided to safely de-energize a section of conductor prior to performing the work. Management system 30 may determine a switch plan and create a planned outage order associated with the switch plan. Management system 30 may also be configured to simulate the switch plan in order to ensure accuracy, safety, and effectiveness of the switch plan. The availability of work crews and tools necessary to perform a desired maintenance/repair may also be coordinated by management system 30. Specifically, management system 30 may be useable by a dispatcher or a network operator to dispatch work crews and tools to appropriate locations, and/or to coordinate switch plans to minimize impact on operation of electric grid 14.

In at least one embodiment, management system 30 may include a supervisory control and data acquisition (SCADA) component, such as the SCADA Energy Management System commercially available from General Electric Company. Specifically, management system 30 may include a user interface that enables a user, such as such as dispatcher, a network operator, electric generating entity engineer, a systems engineer, a transmission engineer, etc., to manage electric grid 14.

In the example embodiment, system 10 includes an advanced metering infrastructure (AMI) subsystem that includes AMI meters 34. AMI meters 34 measure and/or detect an amount of electricity received and/or provided to one or more loads (such as energy user locations 16, etc.) coupled to AMI meters 34. Meters 34 transmit data, such as electricity measurement data, to, and/or receive data from, other devices or systems (including management system 30) within system 10 and/or the AMI subsystem. System 10 may include any suitable number of AMI meters 34. In the example embodiment, AMI meters 34 communicate with other devices and systems via wireless communication over a communication network, such as, e.g., the Internet, a cellular network, etc. In other embodiments, AMI meters 34 may communicate with other devices and systems via wired and/or wireless communication. Moreover, AMI meters 34 may communicate directly or indirectly with other devices and systems.

Sensors 36 are distributed throughout electric grid 14. Sensors 36 may be included within AMI meters 34 and/or may be separate, stand-alone sensors 36. Each sensor 36 monitors one or more parameters of power transmitted through grid 14 at that sensors location. The parameters can include, but are not limited to, a voltage magnitude, a current magnitude, phase of a voltage, phase of a current, etc. In the example embodiment, sensors 36 are communicatively coupled to management system 30. Accordingly, management system 30 may receive current state data from throughout grid 14 from sensors 36 distributed throughout grid 14. Sensors 36 may be coupled to management system 30 directly or indirectly. Moreover, sensors 36 may be coupled to management system by a wired connection and/or a wireless connection.

Figure 2:
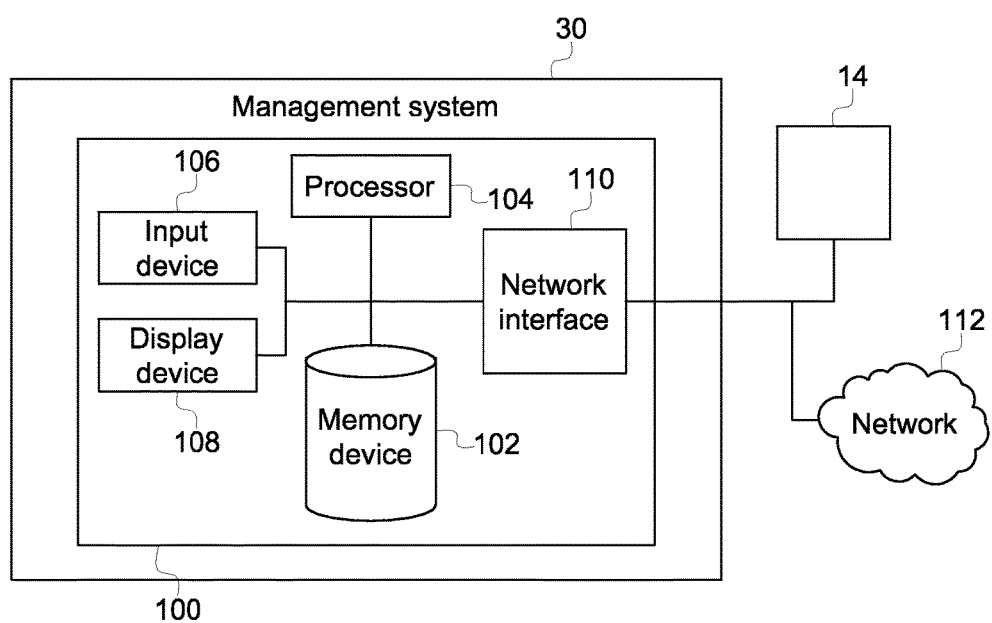

FIG. 2 is an example block diagram of management system 30. In the example embodiment, management system 30 includes a computing assembly 100. Computing assembly 100 may include a personal computer, a workstation, a server, a network computer, a mobile computer, a portable digital assistant (PDA), a smart phone, or other suitable device. As illustrated, computing assembly 100 includes a display device 108, a memory device 102 and a processor 104 in communication with display device 108 and memory device 102. Display device 108 may include, without limitation, a cathode ray tube (CRT) display, a liquid crystal display (LCD), an organic light emitting diode (OLED) display, or other suitable device for use in presenting information to a user (not shown).

Memory device 102 is any suitable device that may be used for storing and/or retrieving information, such as executable instructions and/or data. Memory device 102 may include any computer readable medium, such as hard disk storage, optical drive/disk storage, removable disk storage, flash memory, random access memory (RAM), etc. While memory device 102 is illustrated as a single element in FIG. 2, it should be appreciated that memory device 102 may include one or multiple separate memory devices, located together or remote from one another.

Processor 104 may include one or more processing units (e.g., in a multi-core configuration). The term processor, as used herein, refers to central processing units, microprocessors, microcontrollers, reduced instruction set circuits (RISC), application specific integrated circuits (ASIC), logic circuits, and any other circuit or processor capable of executing instructions. Processor 104 may be programmed to perform alone or in combination any of the processes, methods or functions described herein.

Computing assembly 100 includes an input device 106 for receiving input from user. Input device 106 may include, without limitation, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both display device 108 and input device 106. Further, the particular example embodiment of FIG. 2, computing assembly 100 includes a network interface 110. Network interface 110 may provide communication between computing assembly 100 and electric grid 14 and/or one or more public networks 112, such as Internet, Intranet, a local area network (LAN), a cellular network, a wide area network (WAN), etc.

As described above, grid 14 may be configured and/or reconfigured using management system 30, for example by use of switchable assets 32. Moreover, distributed energy resources 26 may be controlled and/or switched in and/or out of grid 14 using management system 30. By controlling distributed energy resources 26, management system 30 may actively reduce distribution losses in grid 14.

Figure 3:
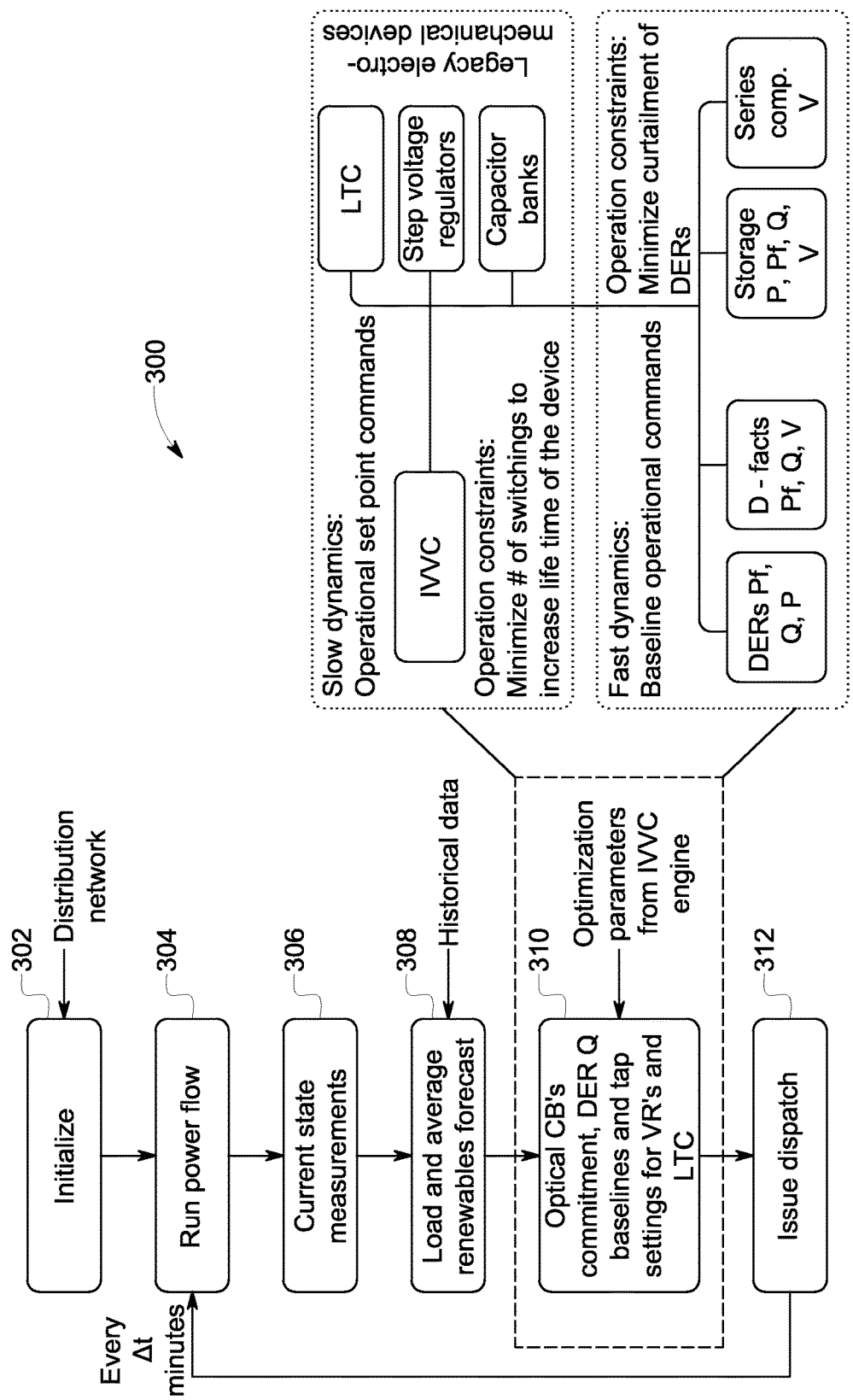

FIG. 3 is a flow diagram of a process of local DER control incorporated into the IVVC optimization control. In electric power generation and delivery system 10, fluctuations in loads and voltage levels are relatively small and significant changes in average load occur relatively slowly and in a predictable fashion throughout the day and year. However, at high levels of DER penetration, such as PV, system 10 experiences relatively rapid variations. For example, in the case of PV, cloud transients can cause ramps in PV generation on the order of 15% per second at a particular location.

In such a scenario existing slow acting control devices such as LTCs, step voltage regulators and shunt capacitors that are limited in their frequency of operations cannot ensure proper voltage regulation across the distribution system. Even if used to respond on shorter timescales, however, the increased number of operations that would be required to counteract the variability due to weather conditions would drastically reduce the lifetime of the switches and tap changers.

Embodiments of the present disclosure formulate IVVC optimization as a dynamic program that results in optimized settings of shunt capacitors or capacitor banks (CB), LTCs and the VAR control at the DER generators and inverters as shown in FIG. 3. These settings are obtained for each hour that remains constant through the hour for slow time scale of load variations. For fast time scales (intra-hour variations), the local control of DER based on the IVVC optimization settings take over. The solution approach is based on Dynamic Programming (DP) algorithm that solves different sub-problems and combines the solutions of the sub-problems to reach an overall solution.

In various embodiments, four different methods for local DER control is incorporated with the IVVC optimization formulation as described herein.

In one embodiment, a computer-implemented method 300 for determining dispatch commands for system 10 includes initializing 302 computing assembly 100 using information from a plurality of sensors, data relating to measured parameters of the network and a determined present state of the electric network. Method 300 also includes executing 304 a power flow of a distribution network (shown in FIG. 4) using the initialized values, determining 306 current state measurement values, acquiring 308 forecast data for system load and the renewable or variable generation. The capacitor banks commitment, DER Q baselines and tap settings are determined for the voltage regulators and load tap-changers using optimization parameters from an IVVC engine running on, for example, computing assembly 100 and a model predictive control algorithm. The IVVC engine works with the slow dynamics components and the fast dynamics components to generate 310 setpoints for relatively long time periods for the slow dynamics components and setpoints for relatively shorter time periods for the fast dynamics components. Dispatch commands are issued 312.

The load forecast for a given time period, for example, 24 hours or longer based on historical data is obtained using an estimation. Because the optimal capacitor bank commitment and tap settings are based on the load forecast, the more accurate the forecast, better the performance of the Volt/VAr optimization algorithms. Even though the calculation is based on every t minutes, in some cases, it may be more than adequate to run the load forecast algorithm every 3-4 hours.

Similarly, for the capacitor bank commitment and VR/LTC tap setting algorithms, it may be more practical to run the algorithms every 15-30 minutes.

Figure 4:
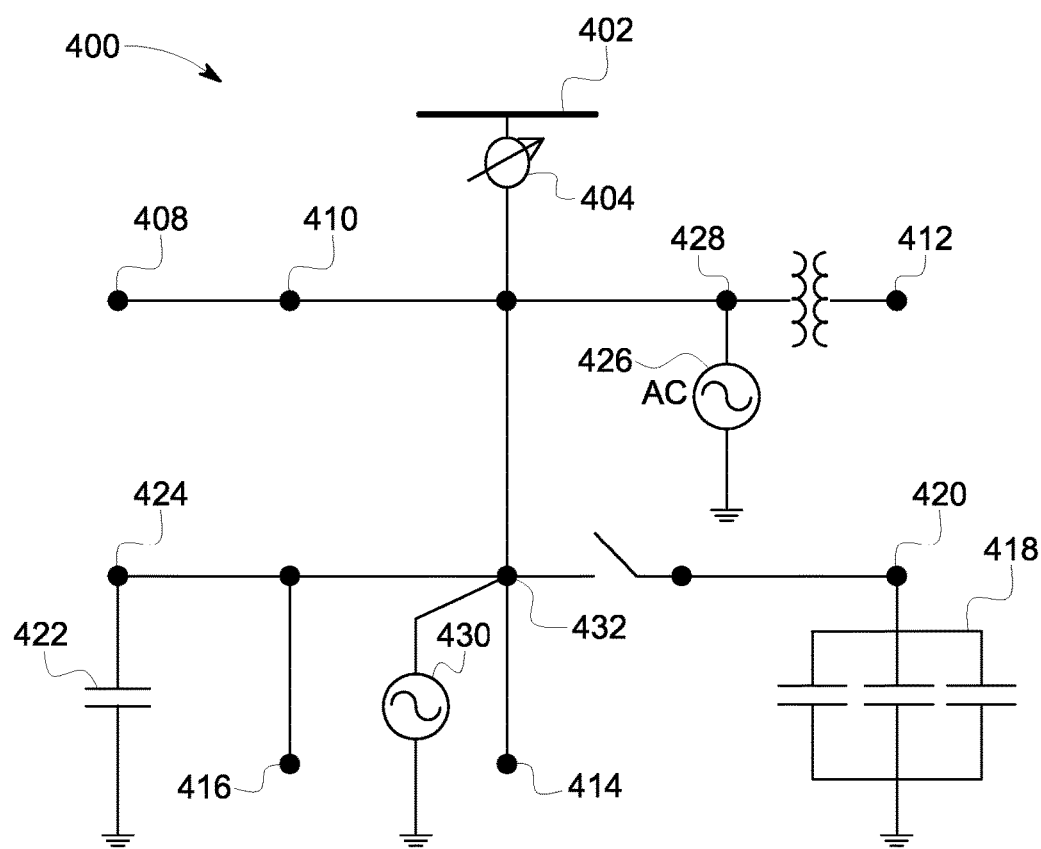

FIG. 4 is a schematic one-line diagram of a distribution network 400 that simply illustrates the more complicated system 10 (shown in FIG. 1). In the example embodiment, distribution network 400 illustrates a distribution feeder 402 with the following characteristics:

relatively short and highly loaded for a 4.16 kV feeder,
a substation voltage regulator 404 including three single-phase units connected in wye,
a load tap changing transformer or autotransformer 406,
unbalanced spot and distributed loads 408, 410, 412, 414, 416,
a 600 kVAr three-phase capacitor bank 418 at bus 420,
a 100 kVAr single-phase capacitor bank 422 at bus 424 on phase C,
a PV plant (DER) 426 with rated inverter of 1500 kVA at bus 428, and
a PV plant (DER) 430 with rated inverter of 2000 kVA at bus 432.

Plants (DER) 426 and 430, in this case PV plants, could be any type of plant or energy resource, such as, wind turbines, are assumed to have excess power capacity to allow for reactive power generation and consumption while operating near maximum real power. Determining the appropriate size of this additional capacity is an important outstanding question and depends on control schemes that coordinate the inverters' response to changes in voltage and power flow. Four local DER control methods for voltage regulation (voltage flattening) utilizing centralized optimal and distributed suboptimal control of PV inverter reactive power generation are described herein.

Figure 5:
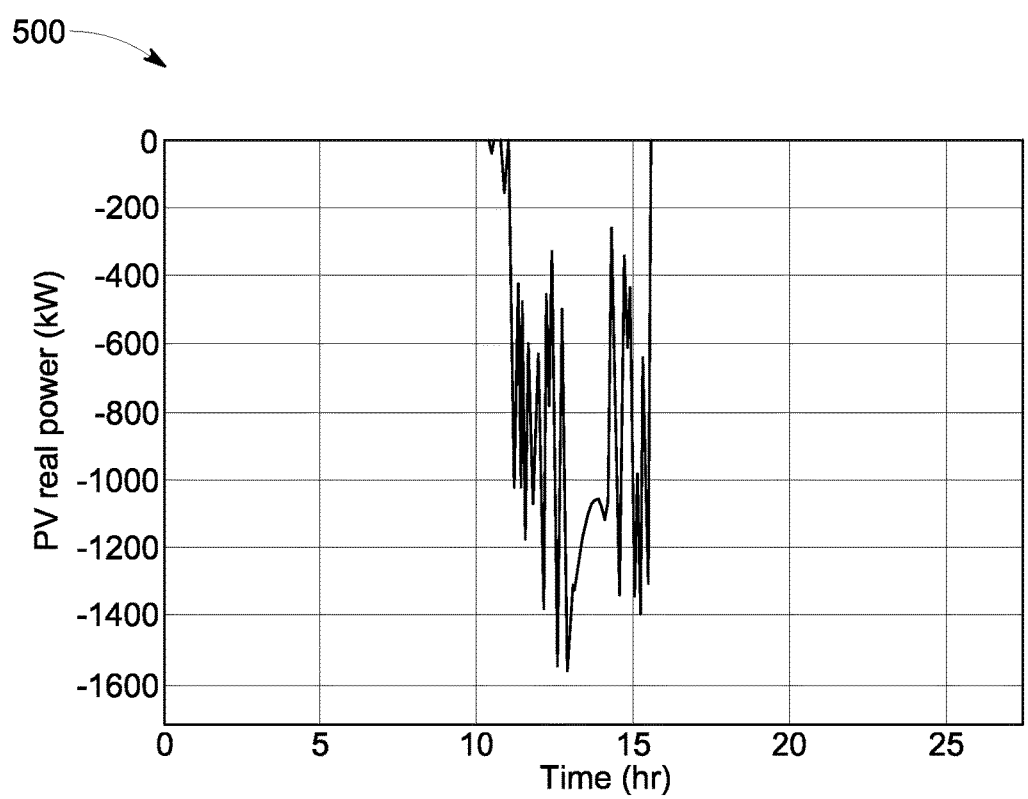

FIG. 5 is a graph of a DER profile 500 used as a daily forecast of DER generation that includes faster variations of DER over a five hour period from, for example, Hour 11 to Hour 16. DER profile 500 is considered for the analysis of advanced IVVC with DER integration. DER profile 500 is normalized and applied as a negative load at bus 428 of 1500 kVA PV Plant 426 and at bus 432 of 2000 kVA PV plant 430. The preliminary scenarios with DER are discussed below. Although described as a DER profile, profile 500 could be specifically related to any variable generation resources, including but not limited to, wind, solar, water, tidal, and/or pumped resources.

Figure 6A:
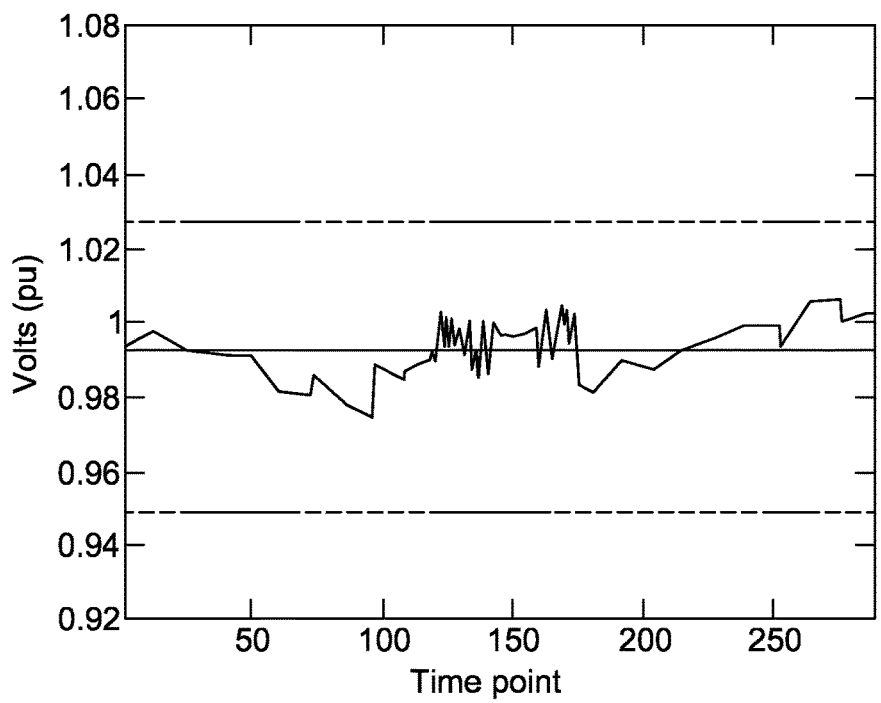
FIG. 6A is a graph of an average voltage profile of the system without DER PV for voltage regulation.
Figure 6B:
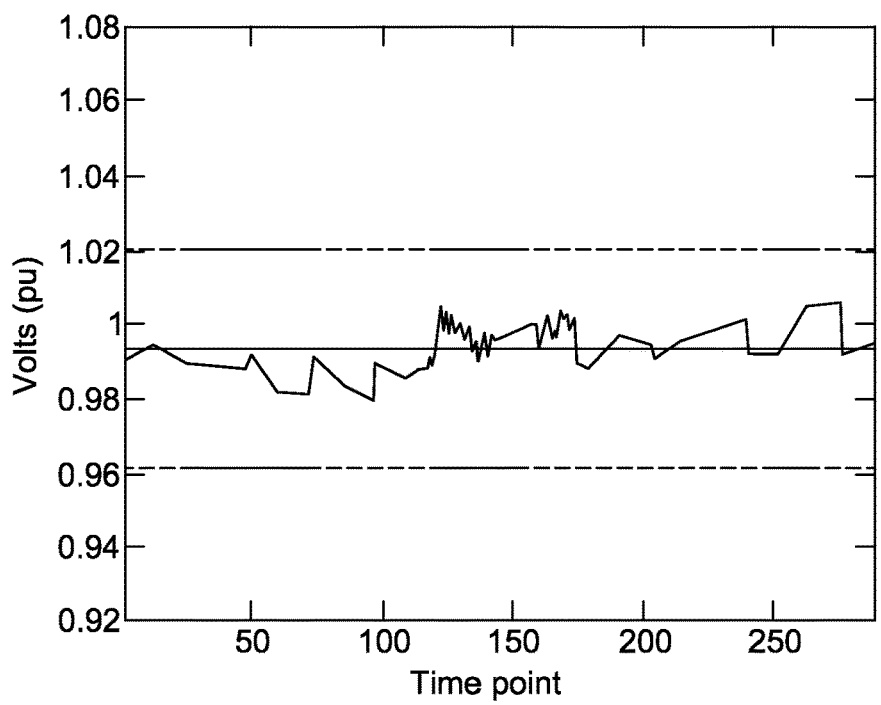
FIG. 6B is a graph of an average voltage profile of the system with DER PV for voltage regulation.

FIG. 6A is a graph 600 of an average voltage profile of distribution network 400 without DER PV for voltage regulation. FIG. 6B is a graph 602 of an average voltage profile of distribution network 400 with DER PV for voltage regulation.

1. No DER Participating in IVVC

Although DER plants provide real power inputs into the distribution feeder at the respective point of connections (POCs) to the feeder; they are operating at unity power factor. This means that their reactive power injections are zero and hence do not contribute to voltage regulation across the feeder. Therefore, the DER inverters are not considered as control devices during the IVVC optimization formulation.

2. DER Participating in IVVC

The DER with variable reactive power output are considered as additional control devices within the optimization problem. FIG. 6B shows that voltage profile across the network is flatter than in FIG. 6A. Rate of change voltage variations also show considerable improvement.

Figure 7A:
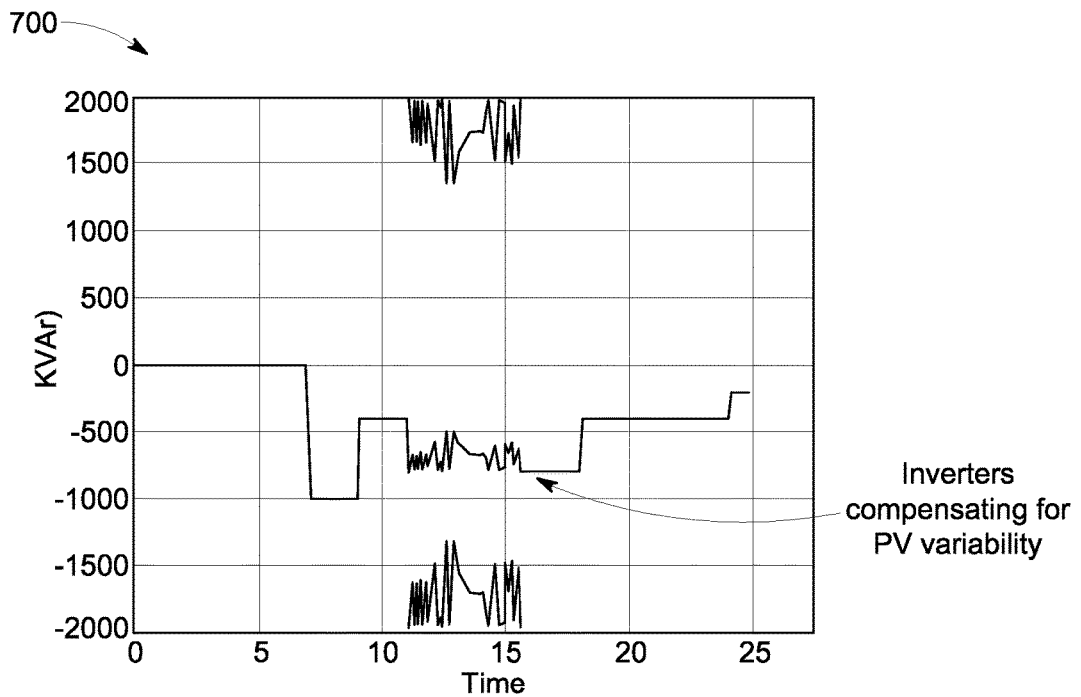
FIG. 7A is a graph of the reactive power output of the inverter associated with the 2000 kVA PV plant while the inverter is participating in flattening the voltage across the feeder network through IVVC.
Figure 7B:
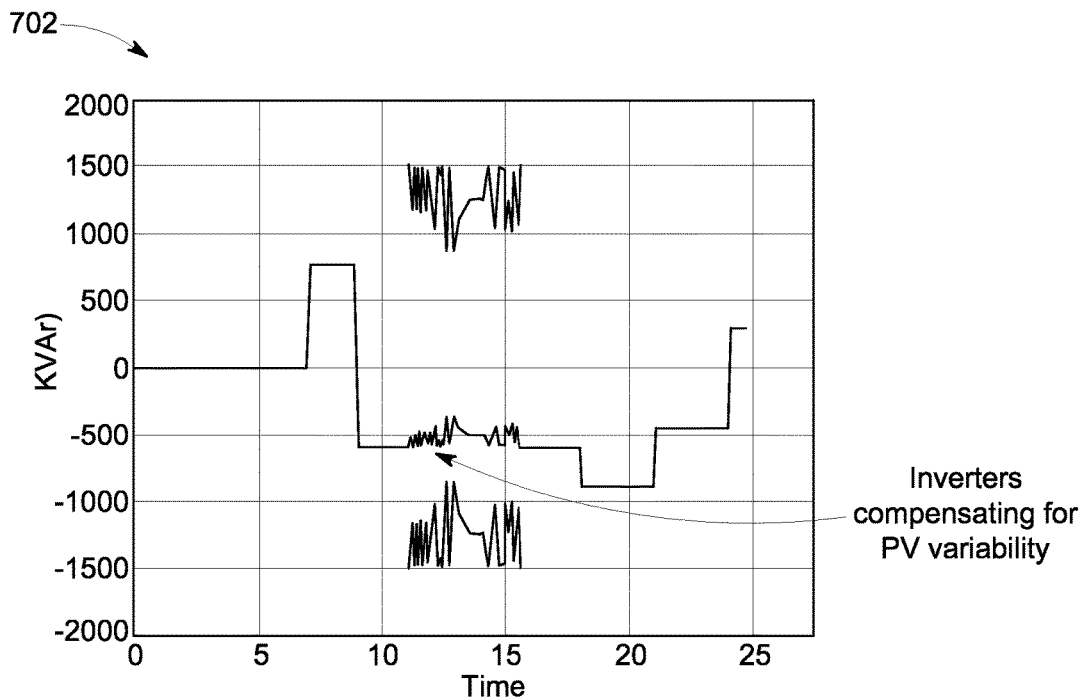
FIG. 7B is a graph of the reactive power output of the inverter associated with the 1500 kVA PV plant while the inverter is participating in flattening the voltage across the feeder network through IVVC.

FIG. 7A is a graph 700 of the reactive power output of the inverter associated with 2000 kVA PV plant 430 while the inverter is participating in flattening the voltage across the feeder network through IVVC. FIG. 7B is a graph 702 of the reactive power output of the inverter associated with 1500 kVA PV Plant 426 while the inverter is participating in flattening the voltage across the feeder network through IVVC.

Figure 8A:
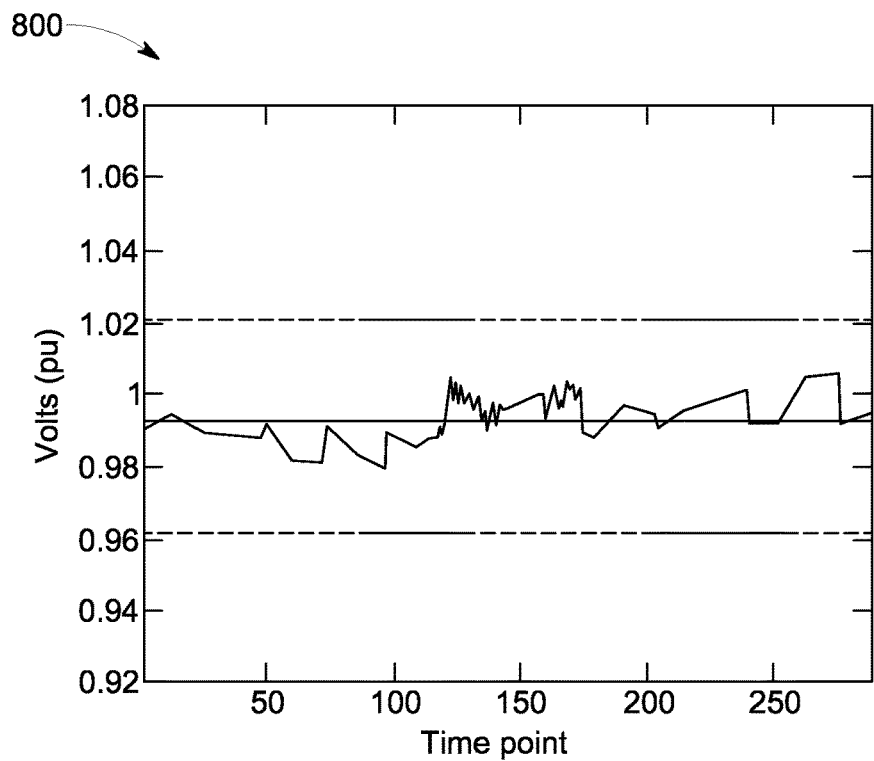
FIG. 8A is a graph of an average voltage profile for a single stage IVVC optimization.
Figure 8B:
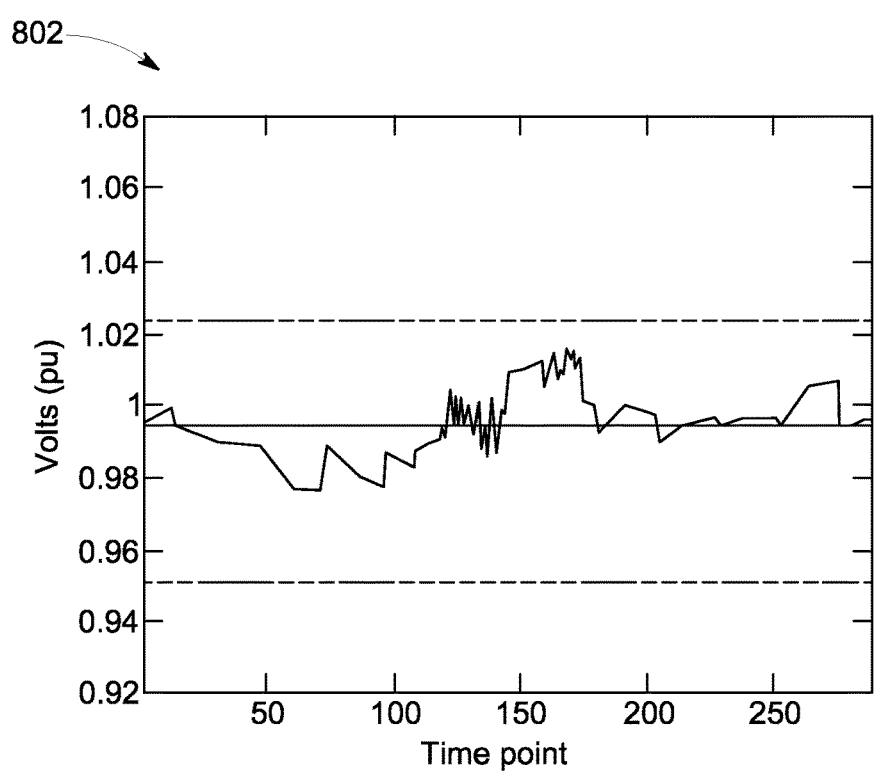
FIG. 8B is a graph of an average voltage profile for a dual stage IVVC optimization.

FIG. 8A is a graph 800 of an average voltage profile for a single stage IVVC optimization. FIG. 8B is a graph 802 of an average voltage profile for a dual stage IVVC optimization. As shown in FIGS. 8A and 8B, the dual stage optimization, FIG. 8B, has higher voltage variations when compared to that using single-stage IVVC. 8A.

Figure 9A:
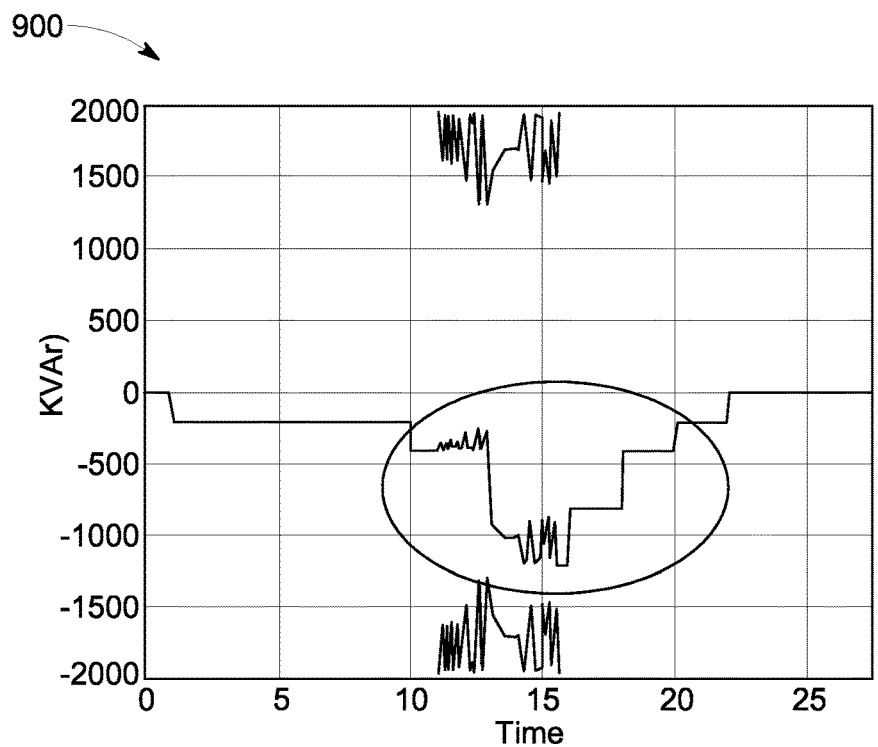
FIG. 9A is a graph of inverter reactive power outputs for a dual stage IVVC optimization.
Figure 9B:
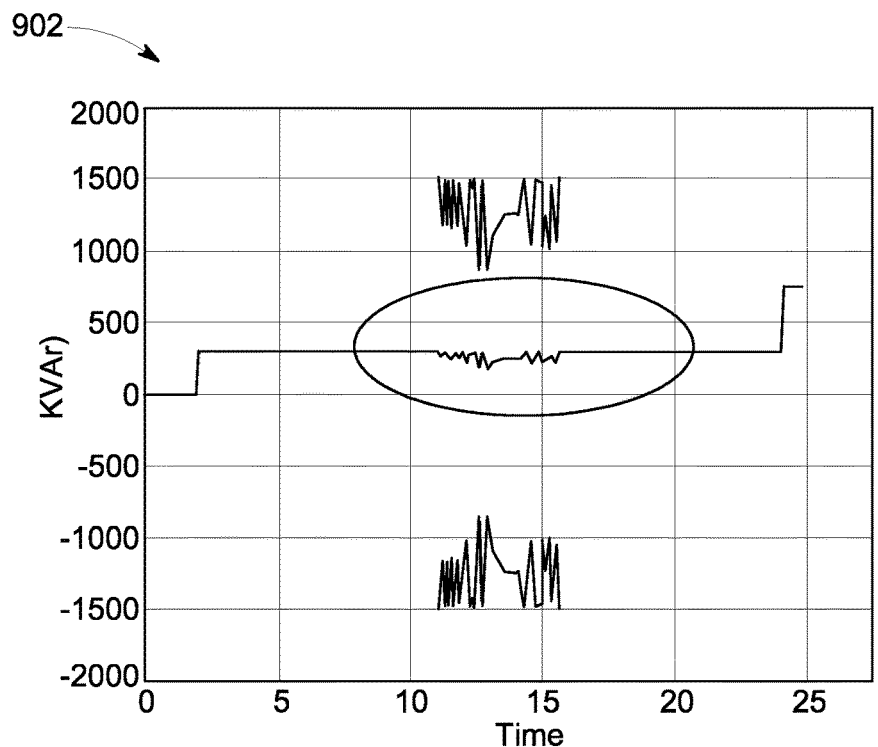
FIG. 9B is a graph of inverter reactive power outputs for a single stage IVVC optimization.

FIG. 9A is a graph 900 of inverter reactive power outputs for a dual stage IVVC optimization. FIG. 9B is a graph 902 of inverter reactive power outputs for a single stage IVVC optimization. Also, as shown in FIG. 9A, dual stage optimization results in higher reactive power outputs of inverters resulting in higher voltages across the feeder test system network. FIG. 9B shows that a single stage optimization including DER control results in a better voltage profile than when done separately.

In this section, four different local voltage control methods for DER are described. These methods are used for local control of the variable generation plant inverters due to fast variations in the DER real power output. The DER described herein are typically PV plants, however, the same principles apply to wind farms, hydro, and other variable generation sources. The fast variations are the intra-hour variations in the variable generation system and therefore require local control at the inverter response.

The four local voltage control methods described herein consider that the IVVC settings provided by the optimization for each $i_{th}$ hour will be used as baseline settings to obtain the reactive power response of the inverter for the intra-hour variations. The DER provide reactive power based on the following local control methods:

Method 1: IVVC settings.
Method 2: Based on PV active power variations.
Method 3: Constant power factor.
Method 4: Constant voltage.

DER Local Control—Method 1

The DER reactive power contribution for this method is based on the baseline IVVC settings that are obtained from the single-stage optimization of the problem formulation. This is described in the following three step process:

Step 1: IVVC optimization provides DER settings for reactive power output for each $i^{th}$ hour as described by the following equation:

$$PVpos_{ref^i} = \pm\left(\frac{1 \cdots n}{n}\right), \quad (1)$$

where
n is number of steps of the inverter response.

Step 2: The baseline reactive power output, at the start of the ith hour is calculated as:

$$Q_{ref^i} = PVpos_{ref^i} \times (\text{Available reative power}) \quad (2)$$

$$= PVpos_{ref^i} \times \sqrt{(KVA^2 - P_{pvi}^2)} \quad (3)$$

Step 3: For intra-hour variable DER variations within the next hour, reactive power contribution of DER is obtained as the following equation:

$$Q_{pv^c} = PVpos_{ref^i} X \sqrt{(KVA^2 - P_{pv^{c2}})}, \quad (4)$$

where $$P_{pv^{c2}}$$

is the current active power of the PV plant.

DER Local Control—Method 2

The DER reactive power contribution for Method 2 is based on PV plant active power variations. This also uses the baseline IVVC settings as in Method 1 obtained through the single-stage optimization of the problem formulation.

Table 1 provides the control philosophy on which the method is based upon. The reactive power contribution of DER is based on the fact that if active power input at each hour is considered as baseline, any further increase or decrease in power injection at the POC will result in increase or decrease of the POC bus voltage. Therefore, to bring back the voltage profile at the bus, reactive power has to be decreased or increased.

TABLE 1

| POC voltage variations due to real power injections | | | |
|---|---|---|---|
| Case | ΔPpv | Vpv | Qpv(inductive) | Qpv(capacitive) |
| 1. | Positive | ↑ | ↓ | ↑ |
| 2. | Negative | ↓ | ↑ | ↓ |

Step 1. Optimization provides DER settings for reactive power output for each $i^{th}$ hour:

$$PVpos_{ref^i} = \pm \left(\frac{1 \cdots n}{n}\right), \quad (5)$$

where
n is number of steps of the inverter response.

Step 2: The baseline reactive power output, $Q_{ref^i}$ and active power output at the start of the $i_{th}$ hour are chosen as reference values for the whole hour.

$$Q_{ref^i} = PVpos_{ref^i} X \sqrt{(KVA^2 - P_{pVi2})} \quad (6)$$

Step 3. For intra-hour DER variations within the next hour, reactive power contribution of DER is obtained as the following equation:

$$Q_{PV^c} = Q_{ref^i} X (1 - (P_{PV^c} - P_{PVi} / P_{PV_{max}})), \text{ where,} \quad (7)$$

PV is the current active power of the DER and is the variable generation plant maximum power output.

DER Local Control—Method 3

The DER reactive power contribution for this method is based on constant power factor for each hour. This also uses the baseline IVVC settings obtained through the single-stage optimization of the problem formulation to obtain the power factor for each hour.

Method 3 is described in the following three step process:
Step 1: IVVC optimization provides DER settings for reactive power output for each ith hour as described by the following equation $$PVpos_{ref^i} = \pm \left(\frac{1 \cdots n}{n}\right), \text{ where} \quad (8)$$

n is number of steps of the inverter response.

Step 2. Based on baseline reactive power output, Qrefi and active power output, $P_{PV}i$, at the start of the ith hour, DER power factor, $pf_i$ is calculated:

$$Q_{ref^i} = PVpos_{ref^i} \times \sqrt{(KVA^2 - P_{PV}i^2)} \quad (9)$$

$$pf_i = \cos(\tan^{-1}(Q_{ref^i} / P_{pV^i})) \quad (10)$$

Step 3. For intra-hour variations in DER output, particularly for PV and wind generation, within the next hour, reactive power contribution is thus determined through the power factor obtained as:

$$Q_{PV^c} = P_{PV^c} \times \sqrt{1 - pfi^2}/pfi, \text{ where}$$

where, $P_{PV^c}$ is the current active power of the PV plant.

DER Local Control—Method 4

DER Reactive power contribution based on voltage set points provided by IVVC.

Step 1. IVVC Optimization is run to determine the voltages for each $i^{th}$ hour at POI where PV plant is connected.

$V_{ref k^i}$ for $k^{th}$ bus is obtained at $i^{th}$ hour from IVVC, $V_{ref k^i}$ represents the voltage set-point where the hourly slow grid variations are compensated by capacitor banks, voltage regulators and tap changers.

Step 2. $V_{ref k^i}$ is then used as the reference voltage regulation set point for PV inverters to act upon for high frequency fluctuations injected by DER.

This represents a set point voltage control that is set every hour and is not bucking the traditional voltage regulation devices.

Figure 10:
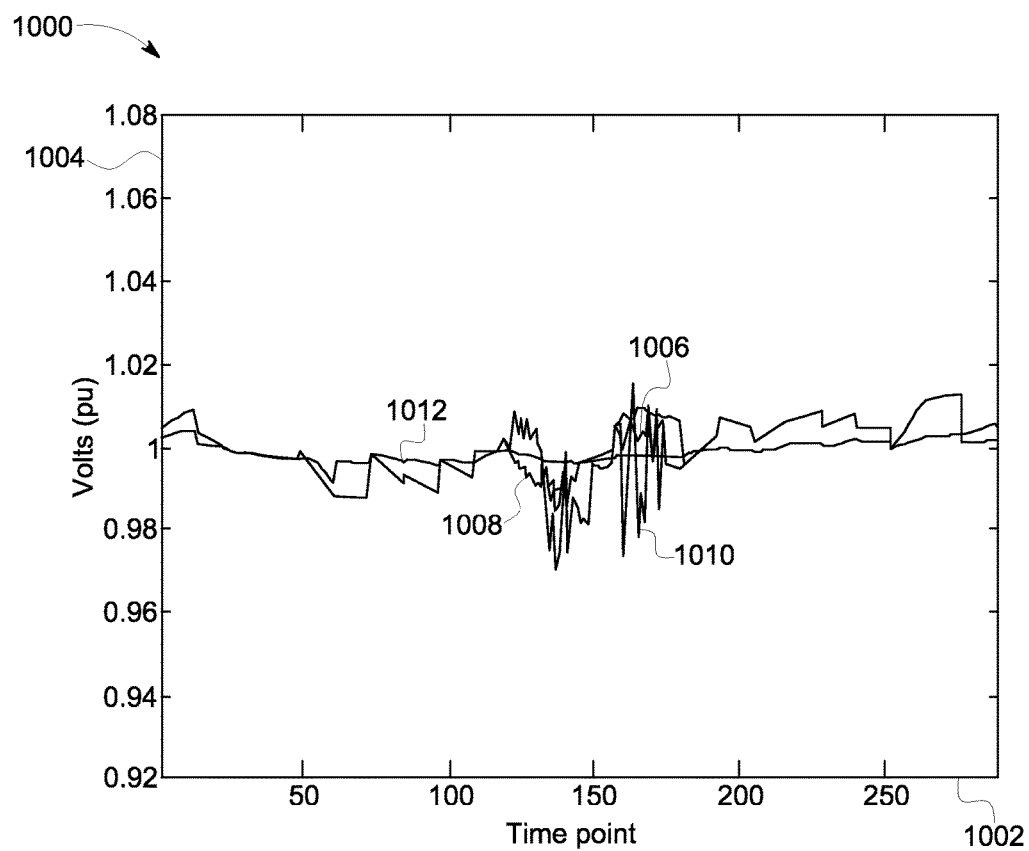

FIG. 10 is a graph 1000 of a comparison average voltage within the distribution network 400 for each of the four methods for local DER control. Graph 1000 includes an x-axis 1002 graduated in units of time and a y-axis 1004 graduated in units of Volts per unit (pu). A trace 1006 illustrates the average voltage using Method 1. A trace 1008 illustrates the average voltage using Method 2. A trace 1010 illustrates the average voltage using Method 3. A trace 1012 illustrates the average voltage using Method 4.

The four DER local control methods for intra-hour fast variations result in similar LTC and capacitor bank positions obtained from the IVVC optimization. FIGS. 8 and 9 show the comparison of the three methods for local DER control. Method 2, which is based on variations in active power (shown in red), results in a smoother voltage profile when compared to the other two methods. This is also observed in reactive power responses of the DER. This means that the inverters react in the right order such that the DER self-compensates for the voltage variations caused by itself rather than depending on predefined compensating schemes such as constant power factor that do not consider present system conditions.

Increasing penetration of distributed energy resources (DER) introduces rapid, large, and random fluctuations in distribution system supply. These fluctuations are introduced, for example, in a PV system, by clouds moving across the sky during portions of the day when the PV system is generating power. In the case of wind resources, normal variation in the wind and gusting tend to produce variable generation. As renewable penetration increases, faster controllers such as inverters and synchronous generator excitation controls will be needed to provide voltage regulation by controlling reactive power flow in the circuit. DER, through its inverter or generator, acts as controllable reactive power source for such purposes. The advantage of an inverter generator relative to conventional step-wise circuit controllers, such as, but, not limited to load tap-changers, capacitor banks, and combinations thereof, is that they are relatively faster, can vary the supplied reactive power continuously, and have low operation costs. Currently, inverters are typically operated at unity power factor and do not participate in VAR control. Controlling reactive power using inverters requires a system to determine, in real-time, how much reactive power to dispatch from each inverter or generator, when to dispatch it, and where and how the control signals should be generated. Described herein above are methods on integration of DERs to provide additional reactive power to enhance Integrated Volt-VAr Control (IVVC) without jeopardizing the overall IVVC objectives and while meeting targets on real power outputs. Also described herein is a software algorithmic approach using determined run times, number of voltage violations, unity power factor at the substation, and number of device operations too improve performance. Two approaches for solving the Volt-VAr Control (VVC) optimization problem: 1) Dynamic programming (DP) and 2) Branch-and-Bound (BB) based on a Knapsack problem formulation are used.

An embodiment of the system described herein is generally useful for controlling an electric network, where the electric network includes a plurality of slow dynamics electromechanical devices, such as traditional or legacy load tap changing transformers, step voltage regulators, and switched capacitor banks, and a plurality of fast dynamics DER devices such as synchronous generators, photovoltaic generators, battery energy storage devices, static synchronous compensators (STATCOM), flexible AC transmission system (FACTS) devices, and static VAR compensators (SVC), all coupled to the electric network.

The slow and fast dynamics devices are necessarily controlled using separate, but also interdependent control schemes. For example, the slow dynamics devices tend to be legacy devices that can have a relatively large impact on system voltage and efficiency and that are traditionally controlled to setpoints adjusted over longer periods of time. The fast dynamics devices tend to be newer DER and renewables-based devices that typically have a relatively smaller, but more variable impact on system voltage and efficiency and as described herein, controlled to setpoints determined locally and adjusted over shorter periods of time.

The system includes an Integrated Volt-VAr Control (IVVC) component configured to determine one or more optimization parameters for the plurality of slow dynamics electromechanical devices and the plurality of fast dynamics DER devices.

The slow dynamics devices are controlled remotely from a central controller using a present state of the electric network and at least one of a voltage rise table that is adaptively updated in real-time using a command output and a power flow-based complete optimization routine that generates optimal setpoints for the traditional controllable assets and for at least some of the fast dynamics DER devices.

The fast dynamics devices are controlled locally between the remote control update by a local setpoint controller using one of four local control methods, 1). a control algorithm using a Distributed Energy Resource (DER) reactive power contribution based on IVVC settings, 2). a control algorithm using a DER reactive power contribution based on DER active power variations, 3). a control algorithm using a DER reactive power contribution based on power factor, and 4). a control algorithm using a DER reactive power contribution based on a voltage of the local electric network.

Based on the foregoing specification, the above-discussed embodiments of the disclosure may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the disclosure. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

As used herein, the terms "software" and "firmware" are interchangeable, and include any computer program stored in memory for execution by processor 104, including RAM memory, ROM memory, EPROM memory, EEPROM memory, and non-volatile RAM (NVRAM) memory. The above memory types are examples only, and are thus not limiting as to the types of memory usable for storage of a computer program.

Example embodiments of the methods and systems described herein relate to electric power generation and delivery systems and, more particularly, to systems and methods for using distributed energy resources (DER) in an electric network. The methods and systems described herein may be implemented using computer programming or engineering techniques including computer software, firmware, hardware or any combination or subset thereof, wherein a technical effect may include at least one of: a). modeling an electric network to determine an expected voltage response to a first electric network state, the state relating to a first configuration of components of the electric network, b). determining a second state of the electric network, the second state occurring a predetermined time after the first state, c). receiving historical state data of the electric network, the historical state occurring prior to the occurrence of the first state, d). determining a second configuration of the components of the electric network based on the model, second network state, and historical network state data, and e). transmitting commands to the components to achieve the second configuration.

Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

Many of the functional units described in this specification have been labeled as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays (FPGAs), programmable array logic, programmable logic devices (PLDs) or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The above-described embodiments of a method and system for controlling voltage on an electrical distribution system provides a cost-effective and reliable means determining an integrated DER-IVVC distribution configuration that uses the reactive capabilities of DER for IVVC. More specifically, the method and system described herein facilitate determining relatively short period voltage setpoints for DER while maintaining the relatively longer time period setpoint control of legacy or slow dynamics components. As a result, the methods and systems described herein facilitate managing electrical distribution networks in a cost-effective and reliable manner.

This written description uses examples to describe embodiments of the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for use in controlling an electric network comprising a plurality of slow dynamics electromechanical devices and a plurality of fast dynamics Distributed Energy Resource (DER) devices configured for relatively fast and continuous dynamic variation of a reactive power output, said system comprising:
an Integrated Volt-VAr Control (IVVC) component configured to determine one or more optimization parameters for the plurality of slow dynamics electromechanical devices and the plurality of fast dynamics DER devices each including an inverter which regulates a DER reactive power,
wherein the slow dynamics devices are configured to be controlled by a present state of the electric network and a voltage rise table that is adaptively updated in real-time using at least one of a command output and a power flow-based complete optimization routine for generating optimal setpoints for the slow dynamics devices and for at least some of the fast dynamics DER devices, wherein the voltage rise table is a look-up table representing voltage variations due to power injections,
wherein the fast dynamics DER devices are configured to be controlled locally between a remote control update using at least one of a control algorithm using a DER reactive power contribution based on IVVC settings, a control algorithm using a DER reactive power contribution based on variable generation DER active power variations, a control algorithm using a DER reactive power contribution based on power factor, and a control algorithm using a DER reactive power contribution based on a voltage of the local electric network.

2. The system of claim 1, wherein the slow dynamics electromechanical devices include at least one of a load tap changing transformer or autotransformer, a step-voltage regulator, and a switched capacitor bank.

3. The system of claim 1, wherein fast dynamics DER devices include at least one of a photovoltaic generator, a synchronous generator, a battery energy storage, a static synchronous compensator (STATCOM), a flexible AC transmission system (FACTS) device, and a static VAR compensator (SVC).

4. The system of claim 1, wherein the reactive power output of the fast dynamics DER devices is discretized in to linear steps to include in the voltage rise table or the power flow based optimization routine.

5. The system of claim 1, wherein the control algorithm using a DER reactive power contribution based on IVVC settings determines a reactive power setting based directly on a variable generation DER setting provided by IVVC optimization for a next time period of a plurality of time periods.

6. The system of claim 1, wherein the control algorithm using a DER reactive power contribution based on the voltage of the local electric network determines a voltage regulation set point from an IVVC optimization at a point of interconnection where fast dynamics DER devices are connected, and wherein the voltage regulation set point is determined for each hour.

7. The system of claim 1, wherein the control algorithm using a DER reactive power contribution based on power factor determines the power factor $pf_i$ at the start of the ith hour as:

$$pf_i = \cos\left(\tan^{-1}\left(\frac{Q_{ref\,i}}{P_{PV\,i}}\right)\right)$$

where Qrefi is baseline reactive power output and $P_{PV}i$ is active power output at the start of the ith hour.

8. The system of claim 7, wherein the Qrefi is calculated by:

$$PVpos_{ref\,i} = \pm\left(\frac{1-n}{n}\right)$$

wherein $$Q_{ref\,i} = PVpos_{ref\,i} \times \sqrt{(KVA^2 - P_{PV\,i}^2)}$$

and where n is number of steps of inverter response of the inverter and KVA is the inverter rating.

9. The system of claim 8, wherein intra-hour reactive power contribution of fast dynamics DER devices is obtained as the following equation:

$$Q_{PV\,c} = Q_{ref\,i} \times \left(1 - \left(\frac{P_{PV\,C} - P_{PV\,i}}{P_{PV_{max}}}\right)\right),$$

Where $P_{PVC}$ is the current active power of the fast dynamics DER devices and $P_{PV_{max}}$ is the maximum power output of fast dynamics DER devices.

10. An electric network control system comprising:
a network model component comprising a model of electrical components electrically coupled to form an electrical transmission and distribution network;
a measurement component configured to receive, from a plurality of sensors, data relating to measured parameters of the network and configured to determine a present state of the electric network;
a historian component configured to receive the sensor data and store at least some of the sensor data;
an estimator component configured to determine an estimate of a system load on the electric network and an estimate of generation of renewable sources coupled to the electric network using the at least some of the sensor data;
an integrated Volt-VAr control (IVVC) component configured to determine one or more optimization parameters for slow dynamics devices and fast dynamics devices coupled to the electric network, wherein the slow dynamics devices are configured to be operable at a single value of the one or more optimization parameters for a relatively long time period compared to a relatively short time period that the fast dynamics devices are operable at a single value of the one or more optimization parameters, wherein each of the fast dynamics devices includes an inverter which regulates the reactive power; and
a dispatch command component configured to:
receive the optimization parameters;
determine at least one of an optimal commitment for capacitor bank devices, distributed energy resource (DER) reactive power baseline values, and tap settings for voltage regulator and load tap changers (LTC), and
issue a dispatch message to the slow dynamics devices and the fast dynamics devices connected to the electric network.

11. The system of claim 10, wherein said IVVC component further comprises an adaptive closed loop voltage rise table updater configured to:
receive the issued dispatch messages and the present electric network state information; and
generate a voltage rise table for the electric network that is adaptively updated in real-time.

12. The system of claim 11, wherein said voltage rise table updater is configured to receive present electric network state information from a Supervisory Control and Data Acquisition (SCADA) system communicatively coupled to the electric network.

13. The system of claim 10, wherein said IVVC component further comprises a local fast dynamics device controller, said fast dynamics device controller comprising at least one of a control algorithm using a DER Reactive power contribution based on IVVC settings, a control algorithm using a DER Reactive power contribution based on photovoltaic (PV) plant Active Power variations, a control algorithm using a DER Reactive power contribution based on power factor, and a control algorithm using a DER Reactive power contribution based on local electric network voltage.

14. The system of claim 13, wherein at least one of said algorithms receives a DER current setting for the DER reactive power contribution.

* * * * *